United States Patent
Gendlin et al.

(10) Patent No.: US 9,660,288 B2
(45) Date of Patent: May 23, 2017

(54) BATTERY SUBUNIT HAVING MULTIPLE BATTERY MODULES THAT ARE CONNECTED TO ONE ANOTHER IN A PARALLEL AND/OR SERIES MANNER, BATTERY SYSTEM AND METHOD FOR PRODUCING A BATTERY SUBUNIT

(71) Applicants: Samsung SDI Co., Ltd., Yongin-si, Gyeonggi-do (KR); Robert Bosch GmbH, Stuttgart (DE)

(72) Inventors: Boris Gendlin, Filderstadt (DE); Johannes Helmich, Karlsruhe (DE); Michael Wellm, Freiberg am Neckar (DE); Wolfgang Duernegger, Schorndorf (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 219 days.

(21) Appl. No.: 14/225,551

(22) Filed: Mar. 26, 2014

(65) Prior Publication Data
US 2014/0295223 A1    Oct. 2, 2014

(30) Foreign Application Priority Data
Mar. 28, 2013   (DE) .................. 10 2013 205 640

(51) Int. Cl.
*H01M 10/04* (2006.01)
*H01M 10/60* (2014.01)
(Continued)

(52) U.S. Cl.
CPC ..... *H01M 10/0404* (2013.01); *B60L 11/1879* (2013.01); *H01M 2/1077* (2013.01);
(Continued)

(58) Field of Classification Search
CPC .......... H01M 10/0404; H01M 10/613; H01M 2/1077; B60L 11/1879; Y10T 29/49002; Y02T 10/705; Y02T 10/7005
See application file for complete search history.

(56) References Cited

U.S. PATENT DOCUMENTS

| 2002/0028375 | A1* | 3/2002 | Morishita | ........... H01M 2/1077 429/120 |
| 2004/0177949 | A1* | 9/2004 | Shimoya | ................. F28F 1/022 165/152 |

(Continued)

FOREIGN PATENT DOCUMENTS

| DE | 1 861 892 B1 | 12/2007 |
| DE | 10 2009 054 921 A1 | 6/2011 |

*Primary Examiner* — Muhammad Siddiquee
(74) *Attorney, Agent, or Firm* — Maginot, Moore & Beck LLP (57) ABSTRACT

A battery subunit includes multiple battery modules that are connected to one another in a parallel and/or series manner, and a thermal management system that contacts each of the multiple battery modules. Each of the multiple battery modules has respective multiple battery cells. The thermal management system is configured to dissipate heat that occurs during operation of the multiple battery modules. The battery subunit further includes a carrier unit that comprises at least one carrier plate positioned on a side of the thermal management system that is remote from the battery modules. The thermal management system is configured to at least partially receive, and on at least two opposite lying edges comprises, in each case, one or multiple grooves configured to collect and/or drain off at least one of fluids that are situated in the at least one carrier plate, and condensation water and/or leakage from the thermal management system.

18 Claims, 4 Drawing Sheets

(51) Int. Cl.
*H01M 2/10* (2006.01)
*H01M 10/613* (2014.01)
*B60L 11/18* (2006.01)

(52) U.S. Cl.
CPC ....... *H01M 10/613* (2015.04); *Y02T 10/7005* (2013.01); *Y02T 10/705* (2013.01); *Y10T 29/49002* (2015.01)

(56) References Cited

U.S. PATENT DOCUMENTS

2009/0253026 A1* 10/2009 Gaben .................... B60R 16/04
429/56
2014/0134469 A1* 5/2014 Damon ............. H01M 10/5016
429/120

* cited by examiner

BATTERY SUBUNIT HAVING MULTIPLE BATTERY MODULES THAT ARE CONNECTED TO ONE ANOTHER IN A PARALLEL AND/OR SERIES MANNER, BATTERY SYSTEM AND METHOD FOR PRODUCING A BATTERY SUBUNIT

This application claims priority under 35 U.S.C. §119 to patent application no. DE 10 2013 205 640.0, filed on Mar. 28, 2013 in Germany, the disclosure of which is incorporated herein by reference in its entirety.

The present disclosure relates to a battery subunit that comprises multiple battery modules that are connected to one another in a parallel and/or series manner and have in each case multiple battery cells, and a thermal management system that contacts in each case the battery modules and is embodied for the purpose of dissipating the heat that occurs during the operation of the battery module. The disclosure also relates to a method for producing a battery subunit of this type. In addition, the disclosure relates to a battery system having multiple battery subunits of this type.

BACKGROUND

Lithium ion battery cells comprise at least one positive electrode or rather cathode, a negative electrode or rather anode, by means of which lithium ions ($Li^+$) can be reversibly stored (intercalation) or output (deintercalation). Considerable demands with regard to safety and performance and also energy density are placed on lithium ion battery cells and on batteries that are further assembled by means of series and/or parallel connections.

Figure 1:
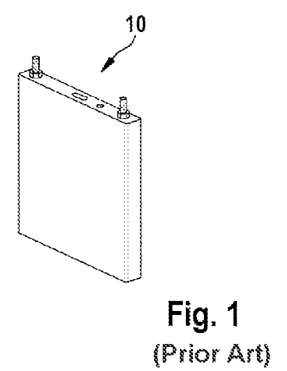
FIG. 1 illustrates a highly schematic perspective view of a battery cell that is known from the prior art.
Figure 2:
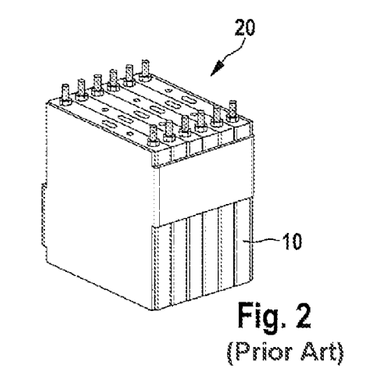
FIG. 2 illustrates a highly schematic perspective view of a battery module that is known from the prior art.
Figure 3:
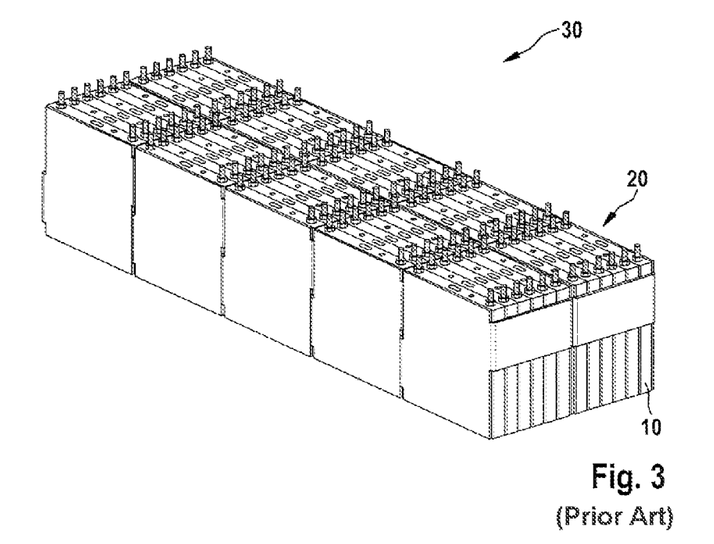
FIG. 3 illustrates a highly schematic perspective view of a battery subunit that is known from the prior art.

FIG. 1 illustrates a highly schematic perspective view of an individual lithium ion battery cell 10. Lithium ion battery cells 10 that are connected in a series and/or parallel manner form lithium ion battery modules as the next integration step in a lithium ion battery. FIG. 2 illustrates a highly schematic perspective view of a lithium ion battery module 20 that comprises multiple lithium ion battery cells 10 that are connected in a series and/or parallel manner. For the purpose of simplifying the illustration, only one single lithium ion battery cell has been provided with the reference numeral 10 in FIG. 2. FIG. 3 illustrates a highly schematic perspective view of a subunit 30 of a battery. Battery subunits 30 of this type are formed in each case by multiple battery modules 20 that are connected in a series and/or parallel manner having in each case multiple battery cells 10. For the purpose of simplifying the illustration, in FIG. 3 only a single lithium ion battery module is provided with the reference number 20 and a single lithium ion battery cell is provided with the reference numeral 10. Battery subunits 30 are equipped with thermal management systems (not illustrated). Lithium ion batteries and accordingly lithium ion storage devices that are used in the automotive industry comprise multiple battery subunits 30 that are connected to one another in a parallel and/or series manner.

The battery pack that is embodied from lithium ion storage devices conforms to the existing installation space. In order to achieve greater packing densities, battery subunits are arranged next to one another in a plane and/or one on top of the other. Suitable frame and housing constructions are necessary for this purpose. Specifically in the case of battery subunits that are arranged one on top of the other, there is the danger that condensation water or leakage from the thermal management systems can cause damage, such as by way of example as a result of short circuits, corrosion and so on, to battery subunits that lie below. This can result in a reduced product quality in addition to a greater potential for danger.

A fluid regulating system for the purpose of controlling fluids, such as by way of example gas, is disclosed in the document EP 1 861 892 B1. The fluid regulating system comprises plates that comprise fluid apertures.

In addition, the document DE 10 2009 054 921 A1 discloses a method and also a device that are preferably used for the purpose of reducing the moisture in housing interiors, in which battery cells or rather batteries are arranged. The condensation water that occurs in the case of condensation is drained off from the intermediate space between the membranes. For this purpose, a drain line is arranged for the purpose of draining off the condensation water.

SUMMARY

A battery subunit is provided in accordance with the disclosure and said battery subunit comprises multiple battery modules that are connected to one another in a parallel and/or series manner and have in each case multiple battery cells, and a thermal management system, wherein the thermal management system contacts in each case the battery modules and is embodied for the purpose of dissipating the heat that occurs during the operation of the battery module. The battery subunit is equipped with a carrier unit that comprises at least one carrier plate, wherein the carrier plate is arranged on the side of the thermal management system that is remote from the battery modules, the thermal management system at least in part receives and comprises in each case one or multiple grooves on at least two edges that lie opposite one another and said grooves are embodied for the purpose of collecting and/or draining off the fluids that are situated in the carrier plate, and/or condensation water and/or leakage from the thermal management system.

In addition, a method for producing a battery subunit in accordance with the disclosure is provided in accordance with the disclosure, in which method multiple battery modules having in each case multiple battery cells are provided and said battery modules are connected to one another in a parallel and/or series manner. In addition, in the case of the method in accordance with the disclosure, a thermal management system and a carrier unit are provided and said thermal management system contacts in each case battery modules and is embodied for the purpose of dissipating the heat that occurs during the operation of the battery modules. The carrier unit is provided for the purpose of receiving the thermal management system on its side that is remote from the battery modules and is arranged and embodied for the purpose of collecting and/or draining off fluids and/or condensation water and/or leakage from the thermal management system.

In other words, in accordance with the disclosure, a battery subunit is provided that fulfills a central function by means of its carrier unit, namely of collecting and/or draining off, in particular draining off in a purposeful manner fluids, such as by way of example condensation water that occurs and/or leakage from the thermal management system. As a consequence, it is possible to drain off fluids, such as by way of example condensation water that occurs and/or leakage from the thermal management system, in a purposeful manner by means of a carrier unit in accordance with the disclosure or rather to supply storage devices that have been provided for this purpose in a defined manner, such as by way of example devices for receiving fluids and/or for storing and/or draining off fluids.

In the case of a battery system that comprises multiple battery subunits in accordance with the disclosure that are arranged in part one on top of the other, the danger of condensation water and/or leakage from thermal management systems causing damage such as by way of example short circuits and/or corrosion of the battery subunits that lie underneath is avoided by means of the carrier units that are provided in accordance with the disclosure and that collect and/or drain off the condensation water and/or leakage from the allocated thermal management system. As a consequence, this provides a robust way of collecting and draining off condensation water and leakage in battery systems, such as by way of example lithium ion storage devices. Safety risks are minimized and the product safety and quality are significantly improved.

Furthermore, a carrier unit having at least one carrier plate is provided in accordance with the disclosure and said carrier unit comprises a simple construction and can be integrated into the structure of an allocated battery subunit in a simple manner without the necessity of constructing additional components.

In a preferred embodiment of the battery subunit in accordance with the disclosure, the grooves that are present on the edges of the carrier plate are provided in a U-shaped manner. It is preferred that the grooves are closed in each case on their ends and/or in each case are reinforced by means of suitable profile elements in the transverse direction. It is preferred that the profile elements are arranged in each groove in a meandering manner in such a manner that the flow of fluids in each groove is not impeded by a barrier. In addition, the grooves preferably comprise in each case at least one drain and further preferably also at least one gradient that is inclined towards the drain. It is preferred that the carrier unit comprises one or multiple profiled beadings that connect in each case two opposite-lying grooves and in each case comprise a gradient that is inclined towards one of the two grooves that are to be connected.

It is preferred that the battery modules and the carrier unit comprise in each case multiple connecting elements that are provided for the purpose of connecting the thermal management system to the battery modules by means of connecting the carrier unit to the battery modules.

In other words, a battery subunit is provided in accordance with the disclosure and said battery subunit comprises multiple battery modules, in particular multiple lithium ion battery modules, having a carrier unit having at least one carrier plate and said carrier unit receives devices of the thermal management system of the battery subunit by means of a carrier plate and is preferably embodied for the purpose of connecting the thermal management system to the battery modules of the battery subunit.

For this purpose the carrier unit and preferably also the battery modules are suitably equipped with connecting elements or rather structural elements. The connecting elements or rather structural elements are preferably also used in a very advantageous manner for the purpose of fastening and or rather integrating and/or connecting battery modules in battery subunits. The connecting elements or rather structural elements can further preferably also render it possible to fasten and/or connect battery subunits in batteries, in particular in lithium ion storage devices.

As a consequence, the edges of a carrier plate that can be installed in a battery subunit in accordance with the disclosure comprise grooves in particular U-shaped grooves that are preferably reinforced in the transverse direction by means of suitable profile elements, and it is further preferred that said grooves are closed at the ends. The profile elements comprise by way of example a meandering shape so that the flow of fluids is not impeded by a barrier. Grooves that lie opposite one another can be connected to profiled beadings wherein the beadings comprise a gradient that is inclined towards one of the two grooves. The grooves preferably comprise a gradient that is inclined towards at least one existing drain. The at least one drain can for this purpose be situated on one end or on the ends of the grooves, in the middle of the groove or at a user defined position in the groove or can be embodied as a combination of the above mentioned variants. If the drain is situated in the middle of the grooves, the grooves comprise in each case two gradients that are inclined towards the drain and said gradients form a V-shape structure.

In the case of a very advantageous embodiment of the battery subunit in accordance with the disclosure, the carrier unit comprises at least one thermal insulation on the side of the carrier plate that is remote from the thermal management system. In addition, the carrier unit is embodied at least in part preferably from a material or material mixture that comprises metallic materials and/or at least one synthetic material and/or at least one fiber-reinforced synthetic material. It is preferred that the carrier unit is at least in part embodied from an electrically insulating material or material mixture in such a manner that the battery subunit can be disconnected from the electric supply. Furthermore, the carrier unit can preferably be embodied at least in part from a flame retardant material or material mixture, wherein the flame retardant material or material mixture is preferably provided as a firewall and/or for the purpose of containing and/or for the purpose of preventing the spread of flames.

Thermal insulation of a carrier plate that can be installed in a battery subunit in accordance with the disclosure can therefore be provided at least in regions that are remote from devices of the thermal management system. In addition, it is possible to embody a carrier plate of this type preferably from a material that preferably contains metallic materials or alternatively synthetic materials or fiber-reinforced synthetic materials. It is also possible to embody a carrier plate of this type at least in part from a material for the purpose of electrically insulating the battery subunit or rather for disconnecting the battery subunit from the electric supply. Furthermore, a carrier plate of this type can be embodied at least in part from a material having flame retardant characteristics. The flame retardant material is used in particular as a firewall or rather for the purpose of containing and/or preventing the spread of flames.

In the case of a particularly advantageous embodiment of the battery subunit in accordance with the disclosure, the carrier unit is provided with one or multiple coatings on its entire surface or on at least a predefined part region or on each of multiple predefined part regions of its surface. At least two of the coatings that are used are embodied from an identical material or material mixture and/or from at least two of the layers that are used are embodied from different materials or material mixtures. In addition, the material or the material mixture from which at least one layer of the layers is embodied comprises preferably at least one predefined functional characteristic, in particular with regard to the wetting capability and/or the thermal insulation capability or thermal conductivity and/or the electrical insulation capability or electrical conductivity and/or the containment and/or prevention of the spread of flames and/or the chemical resistance with respect to predefined chemical materials and/or the resistance with respect to corrosion and or the mechanical damping behavior and/or the penetration behavior.

It is preferred that at least two of the layers that are used have an identical layer thickness and/or at least two of the layers that are used have different layer thicknesses. It is preferred that at least one of the layers that are used has a layer thickness that lies in the sub micrometer range or in the millimeter range or in the centimeter range in dependence upon the installation site and/or the installation conditions.

In the case of a particularly preferred embodiment of the battery subunit in accordance with the disclosure, a functional coating is produced that covers partial or entire surfaces of components and/or component groups of the existing carrier unit, said components being used for the purpose of collecting and/or draining off fluids in particular draining off fluids in a purposeful manner, said fluids being by way of example condensation water that has formed and/or leakages from the thermal management system. It is advantageous that a functional coating of this type can render it possible to achieve and/or adjust and/or improve product characteristics in a purposeful manner.

It is particularly advantageous that one or multiple characteristics of a surface that is coated in a corresponding manner can be adjusted as desired by means of a functional coating. By way of example, it is possible to adjust wetting characteristics that by way of example are responsible for a roll-off effect (lotus effect) and/or a spreading of fluids on a surface that is coated in a corresponding manner. Thermal and/or electrical insulation characteristics and/or thermal and/or electrical conductivity characteristics can also be adjusted. Furthermore, a suitable coating can increase the period in which temperature has an effect and/or the spread of flames can be contained or prevented. In addition, it is possible to adjust the chemical resistance of a surface of the carrier unit irrespectively of the raw material from which the carrier unit is embodied, and/or to adjust the resistance to corrosion of a surface of this type. Furthermore, it is possible to adjust a damping arrangement by way of example with regard to the influence of vibrations and/or acoustic influences and/or energy absorption and/or a penetration behavior by way of example with regard to a crash incident.

A method for producing a battery subunit in accordance with the disclosure is also provided in accordance with the disclosure. It is preferred that, in the case of the method in accordance with the disclosure, the carrier unit of a battery subunit in accordance with the disclosure is coated on at least one part region of its surface with at least one layer of a material or material mixture having at least one predefined functional characteristic by means of vapor deposition or by means of applying a lacquer or by means of a flow coating process or by means of an immersion process.

In other words, in the case of the battery subunit in accordance with the disclosure, it is preferred that a functional coating is provided on partial or entire surfaces of components and/or component groups of the existing carrier unit. In this case, the coating can be an individual layer of one coating material or different coating materials and/or the coating can be a multilayered construction of a coating material or different coating materials. With regard to the layer thickness, it is feasible to use coating methods in which the layers can be deposited in the sub micrometer range. Coating methods that are used can be by way of example the chemical vapor deposition process (CVD) and/or the physical vapor deposition process (PVD).

In addition, the coating can also be layers that comprise a layer thickness that amounts to multiple millimeters or centimeters and preferably depends upon the respective installation site and/or installation conditions. Furthermore, it is feasible to use further coating methods, such as by way of example a method of applying a lacquer, a flow coating method or an immersion method. In the case of the battery subunit in accordance with the disclosure, it is also possible to coat one or multiple part regions of the surface of the carrier unit or the entire surface of the carrier unit by means of layers that are embodied from one or different coating materials and/or one or different layer thicknesses.

A further aspect of the disclosure relates to a battery system having a battery having multiple battery subunits in accordance with the disclosure that are connected to one another in a parallel and/or series manner, wherein at least two of the battery subunits are arranged next to one another in a plane and/or at least two of the battery subunits are arranged one on top of the other.

It is preferred that the battery system in accordance with the disclosure comprises at least one device for receiving fluids and/or storing and/or draining off fluids, said device being embodied and arranged in such a manner that condensation water and/or leakage from the thermal management systems of the battery subunits can be directed in a purposeful manner by means of the carrier units of the battery subunits of the device for receiving fluids and/or storing and/or draining off fluids.

It is preferred that the battery cells of the battery subunits in accordance with the disclosure are lithium ion battery cells. Furthermore, it is preferred that the battery of the battery system in accordance with the disclosure is a lithium ion battery.

A vehicle having a battery system in accordance with the disclosure is also provided in accordance with the disclosure.

Advantageous developments of the disclosure are disclosed in the claims and described in the description.

BRIEF DESCRIPTION OF THE DRAWINGS

Exemplary embodiments of the disclosure are further described with reference to the drawings and the description hereinunder. In the drawings.

DETAILED DESCRIPTION

Figure 4:
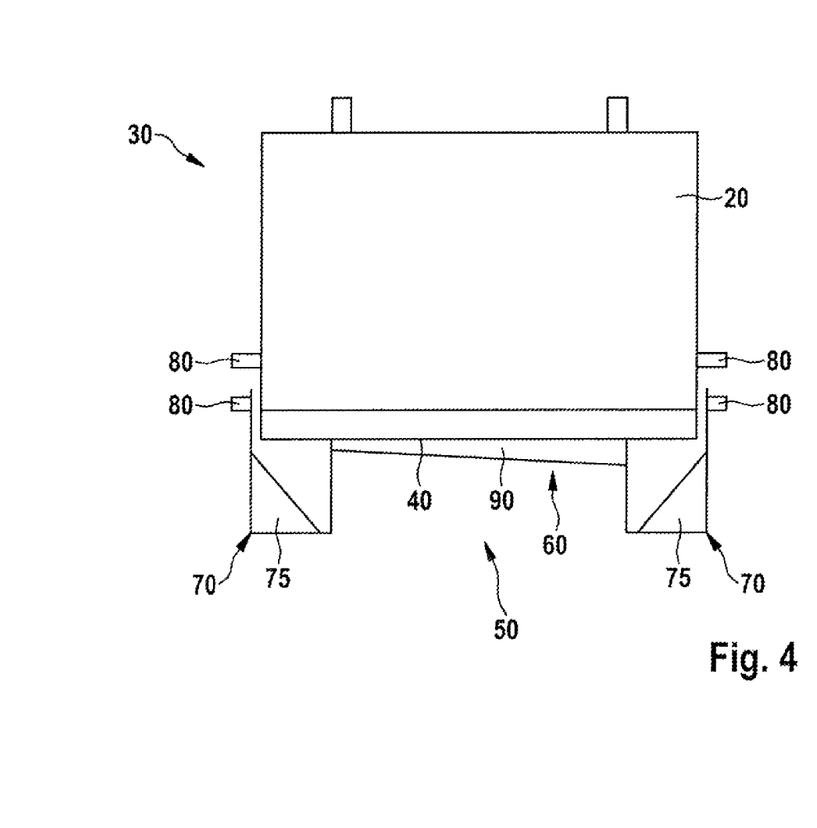
FIG. 4 illustrates a highly schematic sectional view of a battery subunit according to a first embodiment of the disclosure that comprises a carrier unit in accordance with the disclosure.

FIG. 4 illustrates a highly schematic sectional view of a battery subunit 30 according to a first embodiment of the disclosure. The battery subunit 30 comprises multiple battery modules 20 that are connected to one another in a parallel and/or series manner and are arranged one behind the other, and only one individual battery module 20 of said battery modules can be seen in the sectional view in FIG. 4. The battery modules 20 are preferably lithium ion battery modules. In addition, the battery subunit 30 comprises a thermal management system 40 that contacts in each case the battery modules 20 and is embodied for the purpose of dissipating the heat that occurs during the operation of the battery modules.

The battery subunit 30 is provided with a carrier unit 50 that comprises at least one carrier plate 60. The carrier plate 60 is embodied and arranged for the purpose of receiving devices of the thermal management system 40 that is embodied by way of example as a heat exchanger, and said carrier plate is also embodied for the purpose of connecting said devices of the thermal management system by way of example to the illustrated battery module 20. For this purpose, both the battery module 20 as well as the carrier unit 50 are provided with multiple connecting elements 80. As is evident in FIG. 4, the edges of the carrier plate 60 comprise grooves 70 that are embodied in a U-shaped manner and are reinforced in the transverse direction by means of suitable profile elements 75 and are closed on the ends. The profile elements 75 comprise a meandering arrangement so that the flow of fluids is not impeded by a barrier. Grooves 70 that lie opposite one another are connected to profiled beadings 90, wherein the beadings 90 comprise a gradient that is inclined towards one of the two grooves 70. The grooves 70 comprise a gradient that is inclined to at least one of the existing drains.

Figure 5:
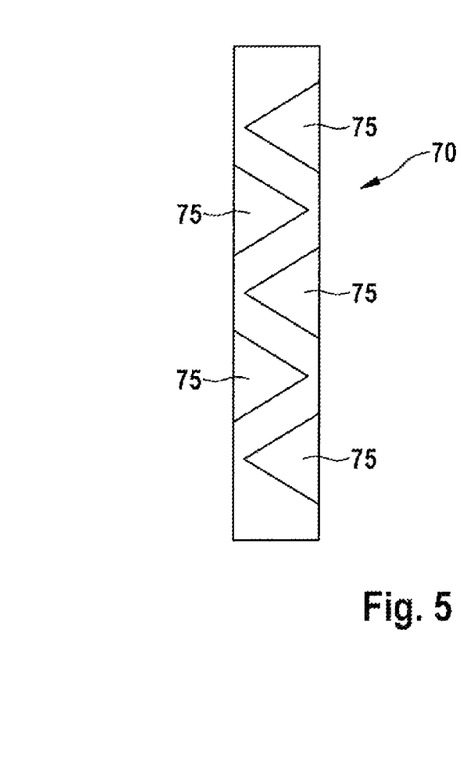
FIG. 5 illustrates a highly schematic plan view of a groove that can be installed in the carrier unit in accordance with the disclosure in FIG. 4, FIGS. 6 to 8 illustrate in each case highly schematic lateral sectional views of an in each case different groove that can be installed in the carrier unit in accordance with the disclosure in FIG. 4.

FIG. 5 illustrates a highly schematic plan view of a groove 70 that can be installed in the carrier unit 50 in accordance with the disclosure of the battery subunit 30 according to the first embodiment of the disclosure. It is evident that the groove 70 is reinforced by means of suitable profile elements 75 in the transverse direction and is closed on the ends. The profile elements 75 comprise a meandering arrangement that renders it possible for the fluids to flow unimpeded by a barrier.

Figure 6:
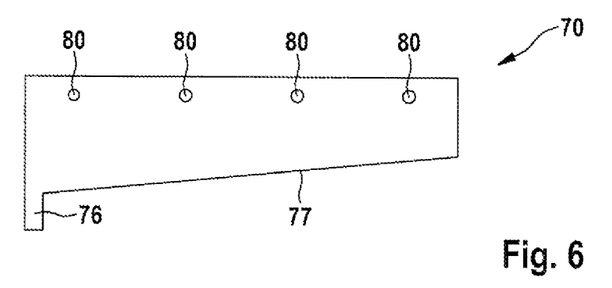
Figure 7:
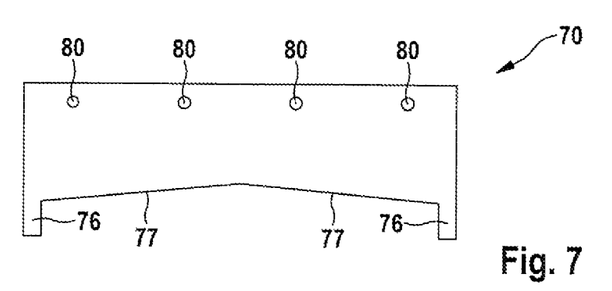
Figure 8:
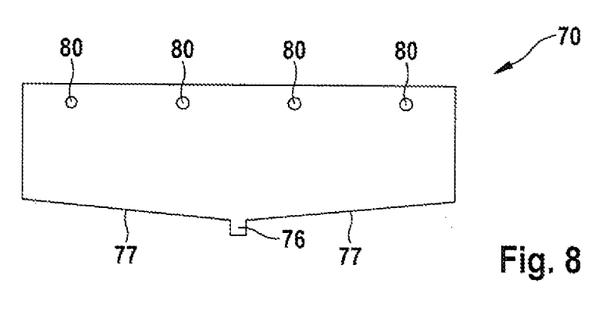

FIGS. 6, 7 and 8 illustrate in each case a highly schematic lateral sectional view of an in each case different groove 70 that can be installed in the carrier unit 50 in accordance with the disclosure of the battery subunit 30 according to the first embodiment of the disclosure. The grooves 70 that are illustrated in FIGS. 6, 7 and 8 comprise in each case at least one drain 76 and at least one gradient 77 that is inclined towards the at least one existing drain 76.

The groove 70 that is illustrated in FIG. 6 comprises a drain 76 that is attached to an end of the groove 70. In addition, the groove 70 comprises an individual gradient 77 that is inclined towards the drain 76. Furthermore, multiple connecting elements 80 are evident in FIG. 6 and said connecting elements are attached to the groove 70 and are provided for the purpose of connecting the carrier unit 50 to the battery modules 20.

The groove 70 that is illustrated in FIG. 7 comprises two drains 76 that are attached in each case to a different end of the groove 70. In addition, the groove 70 comprises two gradients 77 that in each case are inclined towards a different drain 76. Furthermore, multiple connecting elements 80 are also evident in FIG. 7 and said connecting elements 80 are attached to the groove 70 and are provided for the purpose of connecting the carrier unit 50 to the battery modules 20.

The groove 70 that is illustrated in FIG. 8 comprises a drain 76 that is attached in the middle of the groove 70. In addition, the groove 70 comprises two gradients 77 that in each case are inclined towards the same drain 76 that is attached in the middle of the groove 70 and said gradients form a V-shaped structure. Furthermore, multiple connecting elements 80 that are attached to the groove 70 and are provided for the purpose of connecting the carrier unit 50 to the battery modules 20 are also evident in FIG. 8.

Figure 9:
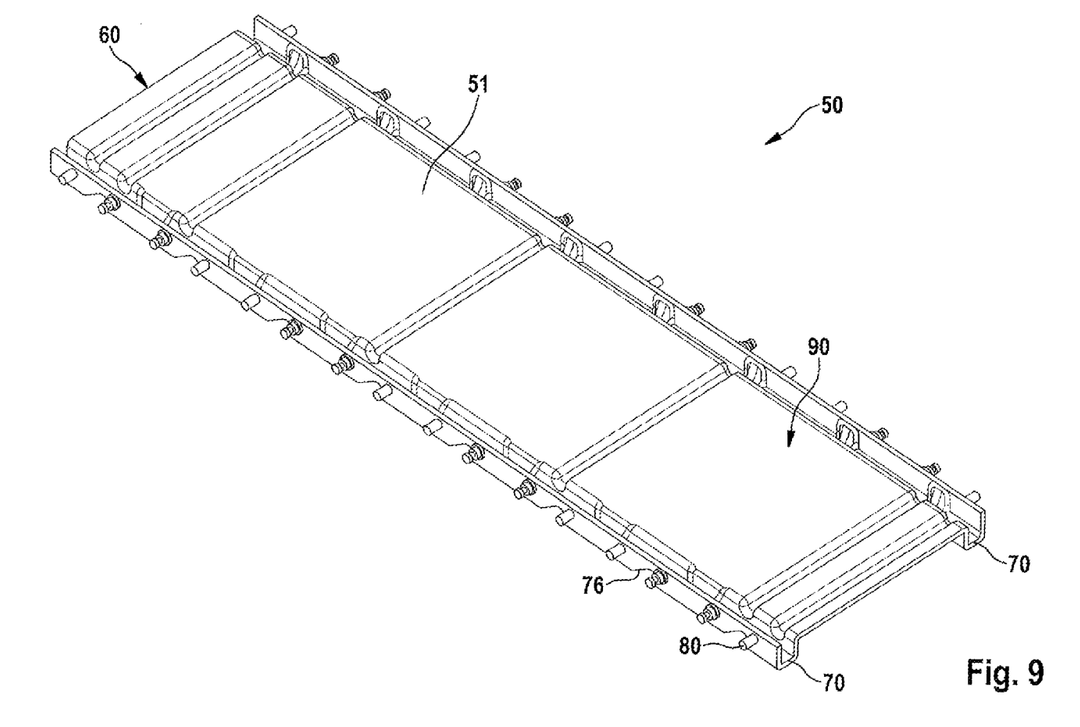
FIG. 9 illustrates a highly schematic perspective view of a carrier unit in accordance with the disclosure of a battery subunit according to a second embodiment of the disclosure.

FIG. 9 illustrates a highly schematic perspective view of a carrier unit 50 in accordance with the disclosure of a battery subunit 30 according to a second embodiment of the disclosure. The carrier unit 50 comprises a carrier plate 60 and multiple U-shaped grooves 70 that are arranged on two opposite-lying edges of the carrier plate 60. Grooves 70 that lie opposite one another are in each case connected to one another by means of a profiled beading 90. Connecting elements 80 are also evident in the illustration in FIG. 9 and said connecting elements are provided for the purpose of connecting the carrier unit 50 to the battery modules 20. In addition, the drains 76 that are situated in the grooves 70 are also evident. For the purpose of simplifying the illustration, only one individual connecting element 80 and only one individual drain 76 are provided with a corresponding reference numeral.

The carrier unit 50 according to the second embodiment of the disclosure can be provided with a coating in each case on its entire surface or on at least one predefined part region 51. A part region of this type that comprises a coating is described in FIG. 3 by the reference numeral 51. A coating of this type can comprise one or multiple layers that are embodied from identical or different materials or material mixtures. The layers can comprise identical or different layer thicknesses. The materials or material mixtures that are used and preferably also the layer thickness are selected in such a manner that at least one functional characteristic of the entire surface of the carrier unit 50 or of the at least one predefined part region 51 of the carrier unit 50 is adjusted as desired. Examples for functional characteristics of this type that can be adjusted as desired are, inter alia, the wetting characteristics, the thermal and/or electrical insulation characteristics, the thermal and/or electrical conductivity characteristics, the characteristics regarding the period in which temperature has an effect and/or the spread of flames, the chemical resistance with respect to predefined chemical materials, the resistance to corrosion and the characteristics with regard to mechanical influences.

What is claimed is:

1. A battery subunit, comprising:
   a plurality of battery modules that are connected in at least one of a parallel configuration and a series configuration, wherein each of the plurality of battery modules includes a plurality of battery cells;
   a thermal management system that contacts each of the plurality of battery modules, and is configured to dissipate operational heat of the plurality of battery modules; and
   a carrier unit that includes at least one carrier plate positioned on a side of the thermal management system that is remote from the plurality of battery modules, the carrier plate defining (i) at least two grooves arranged respectively at opposite lateral edges of the carrier plate and (ii) at least one profiled beading that extends between the grooves,
   wherein a portion of the thermal management system laterally overlaps a portion of the grooves,
   wherein the profiled beading has a first height gradient that laterally directs at least one of fluids situated in the carrier plate, condensation from the thermal management system, and leakage from the thermal management system towards at least one of the grooves, and wherein the grooves have a second height gradient that longitudinally directs the at least one of the fluids, the condensation, and the leakage along the grooves.

2. The battery subunit according to claim 1, wherein the grooves have a U shape.

3. The battery subunit according to claim 1, wherein each of the plurality of battery modules and the carrier unit respectively comprises a plurality of connecting elements protruding therefrom, the connecting elements configured to connect the thermal management system to the plurality of battery modules by connecting the carrier unit to the plurality of battery modules.

4. The battery subunit according to claim 1, wherein the carrier unit includes a thermal insulation at least on a side of the carrier plate that is remote from the thermal management system.

5. The battery subunit according to claim 1, wherein:
the carrier unit further includes a coating on an entirety of a surface of the carrier unit, or on at least one predefined part regions of the surface of the carrier unit;
the coating includes a plurality of layers;
at least one of:
at least two of the plurality of layer have a same material or material mixture; and
at least two of the plurality of layers have different materials or material mixtures; and
at least one layer of the plurality of layers includes a material or material mixture comprising at least one of:
a wetting capability
a thermal insulation capability;
a thermal conductivity;
an electrical insulation capability or electrical conductivity;
a capability to at least one of contain and prevent a spread of flames;
a chemical resistance with respect to predefined chemical materials;
a resistance to corrosion;
a mechanical damping behavior; and
a penetration behavior.

6. The battery subunit according to claim 5, wherein at least one of:
at least two of the plurality of layers have a substantially similar layer thickness;
at least two of the plurality of layers have different layer thicknesses; and
at least one of the plurality of layers has a layer thickness in the sub micrometer range, the millimeter range, or the centimeter range, wherein the layer thickness is based at least in part upon at least one of an installation site and installation conditions.

7. A battery system comprising:
a plurality of battery subunits connected together in at least one of a parallel configuration and a series configuration, wherein each of the plurality of battery subunits respectively includes:
a plurality of battery modules that are connected in at least one of a parallel configuration and a series configuration, wherein each of the plurality of battery modules has a plurality of battery cells;
a thermal management system that contacts each of the plurality of battery modules, and is configured to dissipate operational heat of the plurality of battery modules; and
a carrier unit that includes at least one carrier plate positioned on a side of the thermal management system that is remote from the plurality of battery modules, the carrier plate defining (i) at least two grooves arranged respectively at opposite lateral edges of the carrier plate and (ii) at least one profiled beading that extends between the grooves,
wherein a portion of the thermal management system laterally overlaps a portion of the grooves,
wherein the profiled beading has a first height gradient that laterally directs at least one of fluids situated in the carrier plate, condensation from the thermal management system, and leakage from the thermal management system towards at least one of the grooves,
wherein the grooves have a second height gradient that longitudinally directs the at least one of the fluids, the condensation, and the leakage along the grooves, and
wherein at least one of:
at least two of the plurality of battery subunits are positioned next to one another in a plane; and
at least two of the plurality of battery subunits are positioned one on top of another.

8. The battery system according to claim 7, further comprising at least one device configured to at least one of receive fluids, store fluids, and drain off fluids, wherein the device is configured and positioned such that at least one of condensation water and leakage from the thermal management system is directed via the respective carrier units of the plurality of battery subunits to the device.

9. The battery system according to claim 7, wherein the battery system is connected to a drive system of a motor vehicle.

10. The battery subunit according to claim 1, wherein at least one of the grooves includes closed ends.

11. The battery subunit according to claim 1, wherein at least one of the grooves is reinforced in a transverse direction by at least two profile elements positioned in the at least one groove in a meandering configuration such that a flow of fluids in the at least one groove fails to be impeded by a barrier.

12. The battery subunit according to claim 1, wherein each of the grooves comprises at least one drain and the second height gradient directs the at least one of the fluids, the condensation, and the leakage towards the drain.

13. The battery subunit according to claim 1, wherein carrier unit includes at least one of a metallic material, a synthetic material, and a fiber-reinforced synthetic material.

14. The battery subunit according to claim 1, wherein the carrier unit includes an electrically insulating material or material mixture configured to disconnect the battery subunit from an electric supply.

15. The battery subunit according to claim 1, wherein the carrier unit includes a flame retardant material or material mixture that is at least one of (i) configured as a firewall and (ii) configured to at least one of contain and prevent a spread of flames.

16. The battery subunit according to claim 11, wherein each of the profile elements extends into the at least one groove from a bottom surface of the groove and from one side surface of the groove.

17. The battery subunit according to claim 1, wherein:
the grooves have a third height gradient,
the second height gradient longitudinally directs the at least one of the fluids, the condensation, and the leakage towards a first drain in the respective groove, and
the third height gradient longitudinally directs the at least one of the fluids, the condensation, and the leakage towards a second drain in the respective groove, the second drain spaced from the first drain in the same respective groove.

18. The battery subunit according to claim 1, wherein:

the grooves have a third height gradient, the second height gradient longitudinally directs the at least one of the fluids, the condensation, and the leakage towards a drain in the respective groove, and the third height gradient is different than the second height gradient and longitudinally directs the at least one of the fluids, the condensation, and the leakage towards the drain.

\* \* \* \* \*